(12) United States Patent
Sayed et al.

(10) Patent No.: US 12,083,593 B2
(45) Date of Patent: Sep. 10, 2024

(54) 3D PRINTED PROPPANTS AND METHODS OF MAKING AND USE THEREOF

(71) Applicant: Saudi Arabian Oil Company, Dhahran (SA)

(72) Inventors: Mohammed Ali Ibrahim Sayed, Katy, TX (US); Yanhui Han, Houston, TX (US); Brent Cooper, Missouri City, TX (US); Rajesh Saini, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 168 days.

(21) Appl. No.: 17/365,521

(22) Filed: Jul. 1, 2021

(65) Prior Publication Data

US 2023/0001483 A1    Jan. 5, 2023

(51) Int. Cl.
| | |
|---|---|
| *C09K 8/80* | (2006.01) |
| *B22F 10/14* | (2021.01) |
| *B28B 1/00* | (2006.01) |
| *B29C 64/165* | (2017.01) |
| *B33Y 10/00* | (2015.01) |
| *B33Y 80/00* | (2015.01) |

(52) U.S. Cl.
CPC .............. *B22F 10/14* (2021.01); *B28B 1/001* (2013.01); *B29C 64/165* (2017.08); *B33Y 10/00* (2014.12); *B33Y 80/00* (2014.12)

(58) Field of Classification Search
CPC .......... B22F 10/14; B22F 3/1103; B22F 7/00; B28B 1/001; B29C 64/165; B33Y 10/00; B33Y 80/00; B33Y 70/00; C22C 1/05; E21B 43/267
See application file for complete search history.

(56) References Cited

U.S. PATENT DOCUMENTS

| | | | |
|---|---|---|---|
| 7,767,132 B2 | 8/2010 | Patel et al. | |
| 2009/0014176 A1* | 1/2009 | Miller | C09K 8/805 166/280.1 |
| 2016/0376199 A1* | 12/2016 | Koep | C09K 8/80 507/271 |

FOREIGN PATENT DOCUMENTS

| | | |
|---|---|---|
| WO | 9748557 A2 | 12/1997 |
| WO | 2015023612 A2 | 2/2015 |

OTHER PUBLICATIONS

Sajadi et al., "Direct Ink Writing of Cement Structures Modified with Nanoscale Additive", Advanced Engineering Materials, vol. 21, pp. 1801380 (1-10), 2019.

* cited by examiner

*Primary Examiner* — Kumar R Bhushan
(74) *Attorney, Agent, or Firm* — DINSMORE & SHOHL LLP

(57) ABSTRACT

A 3D printed proppant includes a core having support bars extending from the core to a shell, the shell encapsulating the core and the support bars. Another 3D printed proppant includes a porous core and a shell encapsulating the porous core, where the porous core has a porosity from 25% to 75%. The 3D printed proppant has a particle size from 8 mesh to 140 mesh. The core, the support bars, the porous core, the shell, or combinations thereof includes metal, polymer, ceramic, composite, or combinations thereof. Additionally, a method for producing a 3D printed proppant is provided.

20 Claims, 2 Drawing Sheets

3D PRINTED PROPPANTS AND METHODS OF MAKING AND USE THEREOF

TECHNICAL FIELD

Embodiments of the present disclosure generally relate to 3D printed proppants and methods of making and use thereof.

BACKGROUND

Hydraulic fracturing is a stimulation treatment routinely performed on oil and gas wells. Hydraulic fracturing fluids are pumped into the subsurface formation to be treated, causing fractures to open in the subsurface formation. The wings of the fracture extend away from the wellbore within the formation. Proppants may be mixed with the treatment fluid and deposited in the created fractures to keep the fracture open when the treatment is complete.

SUMMARY

It is often desirable during and after fracturing a subsurface formation to hold the fractures open through the use of proppants for more effective oil and gas production than without. However, sand particles, which are used as a proppant, and constitute more than 90% of all proppants used in hydraulic fracturing, may not provide sufficient crush resistance for use in a given subsurface formation due to higher stresses than what sand can handle. Conventional uncoated proppants break under downhole stress.

As exploration activities extend to deeper wells, common proppants such as sand and resin coated sand fail to withstand increased closure stresses. Consequently, stronger proppants are needed. Ceramic proppants are primarily synthetic proppants with high crush strengths. Compared to uncoated silica sand and resin coated sand, ceramic proppant has higher strength and is more crush resistant. Additionally, ceramic proppants are more uniform in size and shape, and exhibit greater sphericity and roundness than both regular silica sand and resin coated sand. This can maximize porosity and permeability of the proppant bed. Furthermore, ceramic proppants have the highest thermal and chemical stability, which can minimize diagenesis. These improved properties result in greater conductivity inside a fracture as compared to conventional silica sand and resin coated sand.

The specific gravity (S.G) of sand is approximately 2.65 and the manufactured ceramic proppants have S.G as high as 3.9, both of which are significantly heavier than the water (S.G of 1.0) or brine solution (S.G of about 1.2) which are typical base fluids used to carry the proppant to the formation. As a result, there are three major trade-offs in using high density proppants. First, using the higher density materials means smaller fracture volume for a fixed weight of proppant. Second, higher density material means higher cost. Third, a higher density material will have faster settling rate in the carrier fluids. To prevent settling, the common practice is to use high viscosity fracturing fluids to keep the proppant material suspended to allow it to penetrate further into the fractures. However, shale reservoirs are often fractured with low viscosity slickwater which generates long fractures and causes minimal formation damage compared to crosslinked fluids. Due to the relatively low viscosity of the slickwater, a high density proppant cannot be carried efficiently. As such, very high pumping rates are employed to transport the proppant into the fracture by velocity rather than the fluid viscosity and elasticity. Therefore, a proppant with lower density can be more useful in situations where high pump rates or carrier fluids with low viscosities are needed.

Accordingly, a need exists for a proppant with relatively low density and relatively high crush strength. Several techniques have been used to reduce specific gravity of the proppant. Selecting proppant materials with a lower density, such as walnut shells, pits, or husks result in deeper formation penetration, however, these proppants exhibited relatively low crush strength, therefore limiting the applicability of such materials to formations with relatively low closure pressures. Additionally, generation of small particles resulting from crushing of such materials reduces the conductive space available for fluid flow by reducing the fracture network. The present disclosure addresses this need by providing a 3D printed proppant with a API crush resistance strength of greater than 40 Mega Pascals (~6000 psi; which is crush resistance of pure sand proppant of 20/40 mesh with density of 2.65 g/cc) and a density of less than 2.5 grams per cubic centimeter.

According to the subject matter of the present disclosure, a 3D printed proppant includes a core having support bars extending from the core to a shell, the shell encapsulating the core and the support bars, wherein: the core comprises metal, polymer, ceramic, composite or combinations thereof; the support bars comprise metal, polymer, ceramic, composite or combinations thereof; the shell comprises metal, polymer, ceramic, composite, or combinations thereof; and the 3D printed proppant has a particle size from 8 mesh to 140 mesh.

In accordance with another embodiment of the present disclosure, a 3D printed proppant includes a porous core and a shell encapsulating the porous core, wherein: the porous core has a porosity from 10% to 75% and comprises metal, polymer, ceramic, composite, or combinations thereof; the shell comprises metal, polymer, ceramic, composite, or combinations thereof; and the 3D printed proppant has a particle size from 8 mesh to 140 mesh.

In accordance with another embodiment of the present disclosure, a method of producing a 3D printed proppant includes providing a 3D printing apparatus that produces the 3D printed proppant; distributing a layer of build material within a build chamber of the 3D printing apparatus, wherein the build material comprises metal, polymer, ceramic, composite or combinations thereof; depositing a layer of binder material on the layer of build material; curing the binder material within the 3D printing apparatus; and repeating as necessary to produce the 3D printed proppant, wherein: the 3D printed proppant comprises (i) a core having support bars extending from the core to a shell, the shell encapsulating the core, or (ii) a porous core and a shell encapsulating the porous core; the core comprises metal, polymer, ceramic, composite or combinations thereof; the porous core has a porosity from 10% to 75% and comprises metal, polymer, ceramic, composite, or combinations thereof; the support bars comprise metal, polymer, ceramic, composite, or combinations thereof; and the shell comprises metal, polymer, ceramic, composite, or combinations thereof. The 3D printed proppant may need post printing processing to realize the ultimate strength in some cases. For example the ceramic proppants may need to be sintered for realizing the ultimate strength to weight ratio. Polymer based proppants may need to be cured later at higher temperature to cure, crosslink to get the strength. To enhance the properties additives and fillers may need to be added to the printed proppant to enhance mechanical strength such as creep resistance, crush strength improvement, modulus increase, chemical resistance, and to control.

BRIEF DESCRIPTION OF THE DRAWING

The following detailed description of specific embodiments of the present disclosure can be best understood when read in conjunction with the following drawing, where like structure is indicated with like reference numerals and in which.

DETAILED DESCRIPTION

Figure 1A:
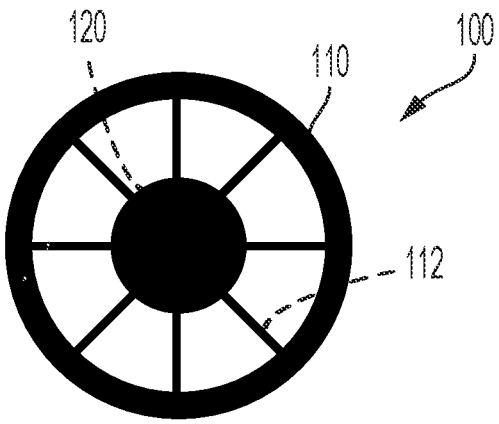
FIG. 1A is a schematic view of a 3D printed proppant, according to one or more embodiments described in this disclosure.

As used throughout this disclosure, the term "hydraulic fracturing" refers to a stimulation treatment routinely performed on hydrocarbon wells in reservoirs with a permeability of less than 200 milliDarcys. Hydraulic fracturing fluids are pumped into a subsurface formation, causing a fracture to form or open. The wings of the fracture extend away from the wellbore according to the natural stresses within the subsurface formation. Proppants are mixed with the treatment fluid and deposited in the created fracture to keep the fracture open when the treatment is complete. Hydraulic fracturing increases surface area to increase fluid production and fluid communication with a subsurface formation and bypasses damage, such as a plugged near wellbore due to drilling fluid or condensate banking that may exist in the near-wellbore area.

As used throughout this disclosure, the term "subsurface formation" refers to a body of rock that is sufficiently distinctive and continuous from the surrounding rock bodies that the body of rock can be mapped as a distinct entity.

As used throughout this disclosure, the term "lithostatic pressure" refers to the pressure of the weight of overburden, or overlying rock, on a subsurface formation.

As used throughout this disclosure, the term "producing subsurface formation" refers to the subsurface formation from which hydrocarbons are produced.

As used throughout this disclosure, the term "proppants" refers to particles of sand, ceramic or other materials that can be mixed with hydraulic fracturing fluid to hold fractures open after a hydraulic fracturing treatment. Proppant materials are carefully sorted for mesh size, roundness and sphericity to provide an efficient conduit for fluid production from the reservoir to the wellbore.

As used throughout this disclosure, the term "reservoir" refers to a subsurface formation having sufficient porosity and permeability to store and transmit fluids.

As used throughout this disclosure, the term "wellbore" refers to the drilled hole or borehole, including the openhole or uncased portion of the well. Borehole may refer to the inside diameter of the wellbore wall, the rock face that bounds the drilled hole.

The present disclosure is directed to compositions and methods for producing 3D printed proppants, to hydraulic fracturing fluids including 3D printed proppants, and to methods for increasing a rate of hydrocarbon production from a subsurface formation through the use of 3D printed proppants including a core and a shell, where the 3D printed proppants have a particle size ranging from 8 mesh to 140 mesh. Mesh is a measurement of particle size often used in determining the particle-size distribution of a granular material. As used throughout this disclosure, "mesh" sizes are designated by the number of openings per linear inch in the sieve. For example, if the proppant particle size is from 8 to 140 mesh, then the proppants will pass through an 8-mesh sieve (particles smaller than 2380 μm) and be retained by a 140-mesh sieve (particles larger than 105 μm). For ease of conversion to particle size, the conversions from mesh to particle size are as follows: 8 mesh (diam. 2380 μm); 16 mesh (diam. 1190 μm); 20 mesh (diam. 841 μm); 30 mesh (diam. 595 μm); 40 mesh (diam. 420 μm); 70 mesh (diam. 210 μm); and 140 mesh (diam. 105 μm).

The 3D printed proppant may include various sizes or shapes. In some embodiments, the one or more 3D printed proppants may have sizes from 8 mesh to 140 mesh, from 8 mesh to 70 mesh, from 8 mesh to 40 mesh, from 8 mesh to 30 mesh, from 8 mesh to 20 mesh, from 8 mesh to 16 mesh, from 16 mesh to 140 mesh, from 16 mesh to 70 mesh, from 16 mesh to 40 mesh, from 16 mesh to 30 mesh, from 16 mesh to 20 mesh, from 20 mesh to 140 mesh, from 20 mesh to 70 mesh, from 20 mesh to 40 mesh, from 20 mesh to 30 mesh, from 30 mesh to 140 mesh, from 30 mesh to 70 mesh, from 30 mesh to 40 mesh, from 40 mesh to 140 mesh, from 40 mesh to 70 mesh, or from 70 mesh to 140 mesh. The 3D printed proppant may be any shape, including spherical, elliptical, cylindrical, or ovoid, as non-limiting examples. The 3D printed proppants may be formed into asymmetrical shapes that are formed to lock in with each other, thereby limiting flowback during production. The 3D printed proppant may have a length from 1 to 5 millimeter (mm), from 1 to 4 mm, from 1 to 3 mm, from 1 to 2 mm, from 2 to 5 mm, from 2 to 4 mm, from 2 to 3 mm, from 3 to 5 mm, from 3 to 4 mm, or from 4 to 5 mm. The 3D printed proppant may have an outer diameter of from 100 to 2000 microns, from 100 to 1500 microns, from 100 to 1000 microns, from 100 to 500 microns, from 500 to 2000 microns, from 500 to 1500 microns, from 500 to 1000 microns, from 1000 to 2000 microns, from 1000 to 1500 microns, or from 1500 to 2000 microns.

As shown in FIG. 1A, in embodiments, the 3D printed proppant 100 may include a core 120 having support bars 112 extending from the core 120 to the shell 110, where the shell 110 encapsulates the core 120 and the support bars 112. The core 120 may include metal, polymer, ceramic, composite, or combinations thereof; the support bars 112 may include metal, polymer, ceramic, composite, or combinations thereof; and the shell 110 may include metal, polymer, ceramic, composite, or combinations thereof. The core 120 may have a diameter ranging from 50 μm to 1000 μm, from 50 μm to 500 μm, from 50 μm to 300 μm, from 50 μm to 200 μm, from 50 μm to 150 μm, from 50 μm to 100 μm, from 100 μm to 1000 μm, from 100 μm to 500 μm, from 100 μm to 300 μm, from 100 μm to 200 μm, from 100 μm to 150 μm, from 150 μm to 1000 μm, from 150 μm to 500 μm, from 150 μm to 300 μm, from 150 μm to 200 μm, from 200 μm to 1000 μm, from 200 μm to 500 μm, from 200 μm to 300 μm, from 300 μm to 1000 μm, from 300 μm to 500 μm, or from 500 μm to 1000 μm.

Figure 1B:
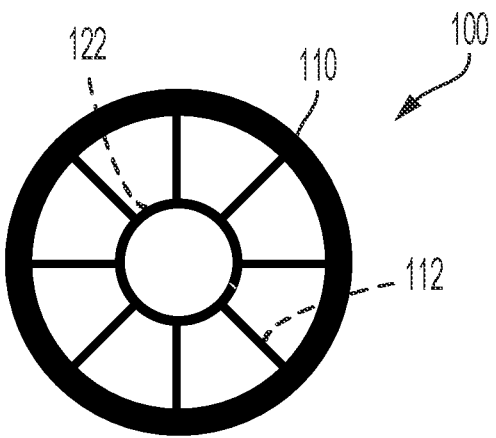
FIG. 1B is a schematic view of a 3D printed proppant, according to one or more embodiments described in this disclosure.

As shown in FIG. 1B, in embodiments, the 3D printed proppant 100 may include a hollow core 122 having support bars 112 extending from the hollow core 122 to the shell 110, where the shell 110 encapsulates the hollow core 122 and the support bars 112. The hollow core 122 may include metal, polymer, ceramic, composite, or combinations thereof; the support bars 112 may include metal, polymer, ceramic, composite, or combinations thereof; and the shell 110 may include metal, polymer, ceramic, composite, or combinations thereof. The hollow core 122 may have an inner diameter ranging from 50 μm to 1000 μm, from 50 μm to 500 μm, from 50 μm to 300 μm, from 50 μm to 200 μm, from 50 μm to 150 μm, from 50 μm to 100 μm, from 100 μm to 1000 μm, from 100 μm to 500 μm, from 100 μm to 300 μm, from 100 μm to 200 μm, from 100 μm to 150 μm, from 150 μm to 500 μm, from 150 μm to 300 μm, from 150 μm to 200 μm, from 200 μm to 1000 μm, from 200 μm to 500 μm, from 200 μm to 300 μm, from 300 μm to 1000 μm, from 300 μm to 1000 μm, or from 300 μm to 500 μm. The hollow core 122 may have an outer diameter ranging from 200 μm to 1000 μm, from 200 μm to 800 μm, from 200 μm to 700 μm, from 200 μm to 600 μm, from 200 μm to 500 μm, from 200 μm to 400 μm, from 400 μm to 1000 μm, from 400 μm to 800 μm, from 400 μm to 700 μm, from 400 μm to 600 μm, from 400 μm to 500 μm, from 500 μm to 1000 μm, from 500 μm to 800 μm, from 500 μm to 700 μm, from 500 μm to 600 μm, from 600 μm to 1000 μm, from 600 μm to 800 μm, from 600 μm to 700 μm, from 700 μm to 1000 μm, from 700 μm to 800 μm, or from 800 μm to 1000 μm.

Figure 1C:
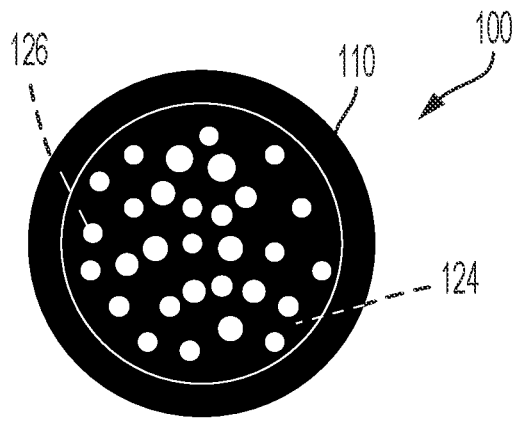
FIG. 1C is a schematic view of a 3D printed proppant, according to one or more embodiments described in this disclosure.

As shown in FIG. 1C, in embodiments, the 3D printed proppant 110 may include a porous core 124 and a shell 110, where the shell 110 encapsulates the porous core 124. The porous core 124 may have a porosity from 10% to 75% and may have empty pores 126 as shown in FIG. 1C. The porous core 124 may have a porosity from 10% to 75%, 25% to 75%, from 25% to 70%, from 25% to 60%, from 25% to 55%, from 25% to 50%, from 25% to 45%, from 25% to 40%, from 25% to 30%, from 30% to 75%, from 30% to 70%, from 30% to 60%, from 30% to 55%, from 30% to 50%, from 30% to 45%, from 30% to 40%, from 40% to 75%, from 40% to 70%, from 40% to 60%, from 40% to 55%, from 40% to 50%, from 40% to 45%, from 45% to 75%, from 45% to 70%, from 45% to 60%, from 45% to 55%, from 45% to 50%, from 50% to 75%, from 50% to 70%, from 50% to 60%, from 50% to 55%, from 55% to 75%, from 55% to 70%, from 55% to 60%, from 60% to 75%, from 60% to 70%, or from 70% to 75%. The porous core 124 may include metal, polymer, ceramic, composite, or combinations thereof; and the shell 110 may include metal, polymer, ceramic, composite, or combinations thereof.

Figure 2:
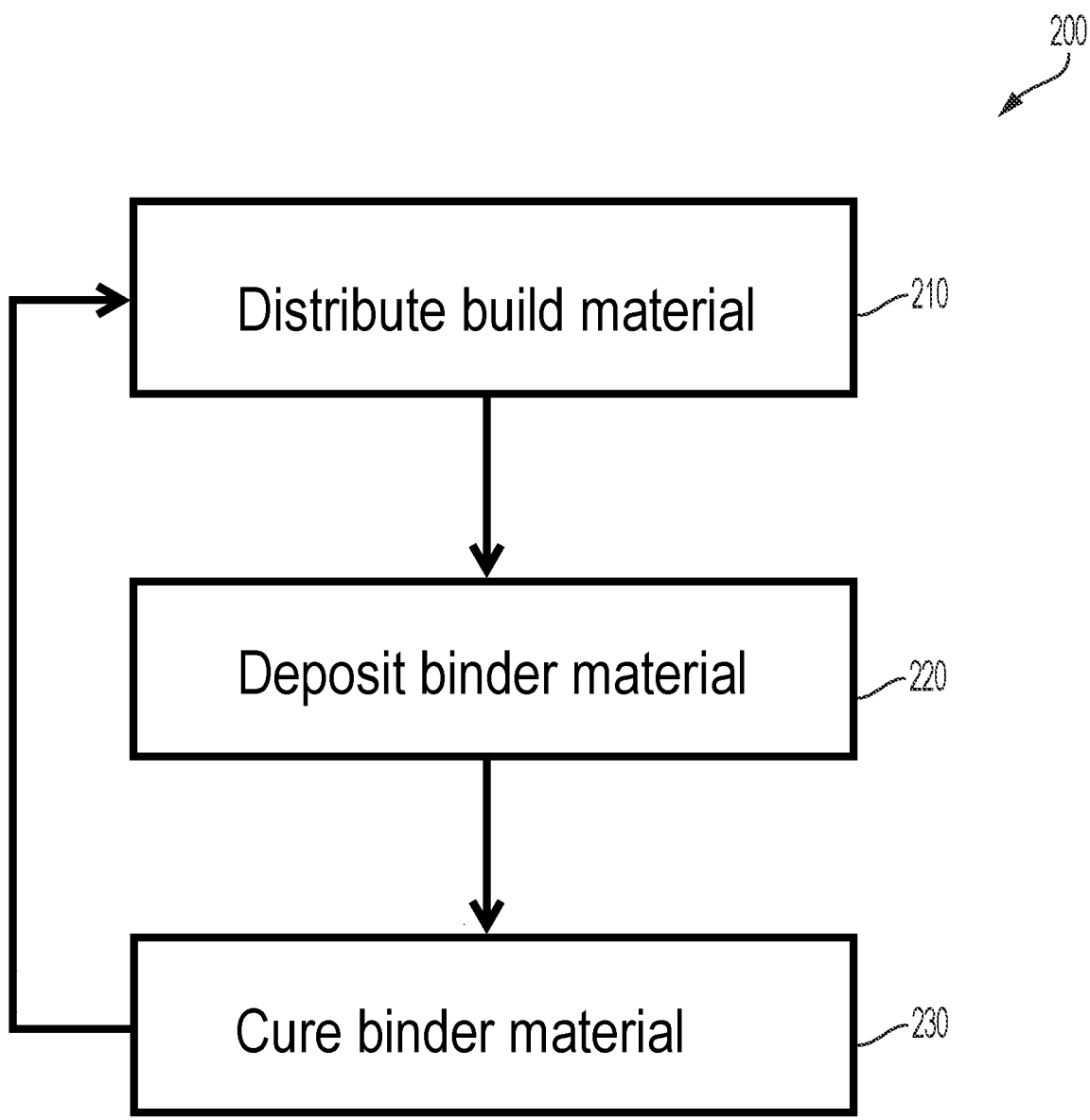
FIG. 2 is a flowchart of a method of making a 3D printed proppant, according to one or more embodiments described in this disclosure.

The proppants may be 3D printed using any 3D printing technology known in the art. The method may include providing any 3D printing apparatus known in the art that is capable of producing the 3D printed proppant described in this disclosure. Referring to FIG. 2, method of making the 3D printed proppants (200) may include where the 3D printing apparatus distributes a layer of build material (210) within a build chamber of the 3D printing apparatus. The method (200) may further include depositing a layer of binder material (220) on the layer of build material. The method (200) further includes curing the binder material (230) within the 3D printing apparatus and repeating as necessary to produce the 3D printed proppant.

The 3D printed proppant may need post printing processing to realize the ultimate strength in some cases. For example the ceramic proppants may need to be sintered for realizing the ultimate strength to weight ratio. Polymer based proppants may need to be cured later at higher temperature to cure, crosslink to get the strength. To enhance the properties additives and fillers may need to be added to the printed proppant to enhance mechanical strength such as creep resistance, crush strength improvement, modulus increase, chemical resistance, or to control density.

The build material may include any material suitable for use in hydraulic fracturing applications. The build material of the 3D printed proppant may be chosen based on the particular application and characteristics desired, such as the depth of the subsurface formation in which the proppant particles will be used, as proppant particles with greater mechanical strength are needed at greater lithostatic pressures. For instance, ceramic proppant materials exhibit greater strength, thermal resistance, and conductivity than conventional proppant particles made out of sand. In embodiments, the build material may include metal, polymer, ceramic, composite, or combinations thereof, to form the 3D printed proppant.

The metal may include titanium alloy, nickel alloy, aluminum alloy, titanium-aluminum alloy, chromium alloy, cobalt alloy, copper alloy, gallium alloy, iron alloy, iron, nickel, chromium, silicon, aluminum, copper, cobalt, beryllium, tungsten, molybdenum, titanium, magnesium, silver, as well as alloys of metals, and the like, or any combination of these. The metal may also include the family of intermetallic materials, such as iron aluminides, nickel aluminides, and titanium aluminides, or combinations thereof. The 3D printed proppant may include from 0 to 100 wt. % metal, by weight of the 3D printed proppant. In embodiments, the 3D printed proppant may include from 0 to 100 wt. %, from 0 to 90 wt. %, from 0 to 80 wt. %, from 0 to 70 wt. %, from 0 to 60 wt. %, from 0 to 50 wt. %, from 0 to 40 wt. %, from 0 to 30 wt. %, from 0 to 20 wt. %, from 0 to 10 wt. %, from 0 to 1 wt. %, from 1 to 100 wt. %, from 1 to 90 wt. %, from 1 to 80 wt. %, from 1 to 70 wt. %, from 1 to 60 wt. %, from 1 to 50 wt. %, from 1 to 40 wt. %, from 1 to 30 wt. %, from 1 to 20 wt. %, from 1 to 10 wt. %, from 10 to 100 wt. %, from 10 to 90 wt. %, from 10 to 80 wt. %, from 10 to 70 wt. %, from 10 to 60 wt. %, from 10 to 50 wt. %, from 10 to 40 wt. %, from 10 to 30 wt. %, from 10 to 20 wt. %, from 20 to 100 wt. %, from 20 to 90 wt. %, from 20 to 80 wt. %, from 20 to 70 wt. %, from 20 to 60 wt. %, from 20 to 50 wt. %, from 20 to 40 wt. %, from 20 to 30 wt. %, from 30 to 100 wt. %, from 30 to 90 wt. %, from 30 to 80 wt. %, from 30 to 70 wt. %, from 30 to 60 wt. %, from 30 to 50 wt. %, from 30 to 40 wt. %, from 40 to 100 wt. %, from 40 to 90 wt. %, from 40 to 80 wt. %, from 40 to 70 wt. %, from 40 to 60 wt. %, from 40 to 50 wt. %, from 50 to 100 wt. %, from 50 to 90 wt. %, from 50 to 80 wt. %, from 50 to 70 wt. %, from 50 to 60 wt. %, from 60 to 100 wt. %, from 60 to 90 wt. %, from 60 to 80 wt. %, from 60 to 70 wt. %, from 70 to 100 wt. %, from 70 to 90 wt. %, from 70 to 80 wt. %, from 80 to 100 wt. %, from 80 to 90 wt. %, or from 90 to 100 wt. % metal by weight of the 3D printed proppant.

In embodiments, the metal may include a titanium alloy including titanium, molybdenum, vanadium, iron, aluminum, nickel, or combinations thereof. In embodiments, the titanium alloy may include titanium, molybdenum, vanadium, iron, and aluminum. In embodiments, the titanium alloy may include titanium, molybdenum, and nickel. The titanium alloy may include from 70 to 99.9 weight percent (wt. %), from 70 to 99.5 wt. %, from 70 to 99.3 wt. %, from 70 to 99.0 wt. %, from 70 to 98 wt. %, from 70 to 95 wt. %, from 70 to 90 wt. %, from 70 to 85 wt. %, from 70 to 82 wt. %, from 70 to 80 wt. %, from 75 to 99.9 wt. %, from 75 to 99.5 wt. %, from 75 to 99.3 wt. %, from 75 to 99.0 wt. %, from 75 to 98 wt. %, from 75 to 95 wt. %, from 75 to 90 wt. %, from 75 to 85 wt. %, from 75 to 82 wt. %, from 75 to 80 wt. %, from 77 to 99.9 wt. %, from 77 to 99.5 wt. %, from 77 to 99.3 wt. %, from 77 to 99.0 wt. %, from 77 to 98 wt. %, from 77 to 95 wt. %, from 77 to 90 wt. %, from 77 to 85 wt. %, from 77 to 82 wt. %, from 77 to 80 wt. %, from 90 to 99.9 wt. %, from 90 to 99.5 wt. %, from 90 to 99.3 wt. %, from 90 to 99.0 wt. %, from 90 to 98 wt. %, from 90 to 95 wt. %, from 95 to 99.9 wt. %, from 95 to 99.5 wt. %, from 95 to 99.3 wt. %, from 95 to 99.0 wt. %, from 95 to 98 wt. %, from 98 to 99.9 wt. %, from 98 to 99.5 wt. %, from 98 to 99.3 wt. %, from 98 to 99.0 wt. %, from 99.0 to 99.9 wt. %, from 99.0 to 99.5 wt. %, from 99.0 to 99.3 wt. %, approximately 79 wt. %, or approximately 99.1 wt. % titanium by weight of the titanium alloy.

The titanium alloy may include from 0.1 to 20 wt. %, from 0.1 to 15 wt. %, from 0.1 to 10 wt. %, from 0.1 to 9 wt. %, from 0.1 to 8 wt. %, from 0.1 to 7 wt. %, from 0.1 to 5 wt. %, from 0.1 to 2 wt. %, from 0.1 to 1 wt. %, from 0.1 to 0.5 wt. %, from 0.1 to 0.4 wt. %, from 0.2 to 20 wt. %, from 0.2 to 15 wt. %, from 0.2 to 10 wt. %, from 0.2 to 9 wt. %, from 0.2 to 8 wt. %, from 0.2 to 7 wt. %, from 0.2 to 5 wt. %, from 0.2 to 2 wt. %, from 0.2 to 1 wt. %, from 0.2 to 0.5 wt. %, from 0.2 to 0.4 wt. %, from 2 to 20 wt. %, from 2 to 15 wt. %, from 2 to 10 wt. %, from 2 to 9 wt. %, from 2 to 8 wt. %, from 2 to 7 wt. %, from 2 to 5 wt. %, from 5 to 20 wt. %, from 5 to 15 wt. %, from 5 to 10 wt. %, from 5 to 9 wt. %, from 5 to 8 wt. %, from 5 to 7 wt. %, from 7 to 20 wt. %, from 7 to 15 wt. %, from 7 to 10 wt. %, from 7 to 9 wt. %, from 7 to 8 wt. %, from 8 to 20 wt. %, from 8 to 15 wt. %, from 8 to 10 wt. %, from 8 to 9 wt. %, approximately 0.3 wt. %, or approximately 8 wt. % molybdenum by weight of the titanium alloy.

The titanium alloy may include from 5 to 20 wt. %, from 5 to 15 wt. %, from 5 to 10 wt. %, from 5 to 9 wt. %, from 5 to 8 wt. %, from 5 to 7 wt. %, from 7 to 20 wt. %, from 7 to 15 wt. %, from 7 to 10 wt. %, from 7 to 9 wt. %, from 7 to 8 wt. %, from 8 to 20 wt. %, from 8 to 15 wt. %, from 8 to 10 wt. %, from 8 to 9 wt. %, or approximately 8 wt. % vanadium by weight of the titanium alloy.

The titanium alloy may include from 0.1 to 10 wt. %, from 0.1 to 5 wt. %, from 0.1 to 3 wt. %, from 0.1 to 2 wt. %, from 0.1 to 1 wt. %, from 0.5 to 10 wt. %, from 0.5 to 5 wt. %, from 0.5 to 3 wt. %, from 0.5 to 2 wt. %, from 0.5 to 1 wt. %, from 1 to 10 wt. %, from 1 to 5 wt. %, from 1 to 3 wt. %, from 1 to 2 wt. %, from 2 to 10 wt. %, from 2 to 5 wt. %, from 2 to 3 wt. %, from 3 to 10 wt. %, from 3 to 5 wt. %, from 5 to 10 wt. %, or approximately 2 wt. % iron by weight of the titanium alloy.

The titanium alloy may include from 0.5 to 10 wt. %, from 0.5 to 5 wt. %, from 0.5 to 4 wt. %, from 0.5 to 3 wt. %, from 0.5 to 2 wt. %, from 1 to 10 wt. %, from 1 to 5 wt. %, from 1 to 4 wt. %, from 1 to 3 wt. %, from 1 to 2 wt. %, from 2 to 10 wt. %, from 2 to 5 wt. %, from 2 to 4 wt. %, from 2 to 3 wt. %, from 3 to 10 wt. %, from 3 to 5 wt. %, from 3 to 4 wt. %, from 4 to 10 wt. %, from 4 to 5 wt. %, from 5 to 10 wt. %, or approximately 3 wt. % aluminum by weight of the titanium alloy.

The titanium alloy may include from 0.1 to 5 wt. %, from 0.1 to 2 wt. %, from 0.1 to 1.5 wt. %, from 0.1 to 1.0 wt. %, from 0.1 to 0.7 wt. %, from 0.1 to 0.5 wt. %, from 0.5 to 5 wt. %, from 0.5 to 2 wt. %, from 0.5 to 1.5 wt. %, from 0.5 to 1.0 wt. %, from 0.5 to 0.7 wt. %, from 0.7 to 5 wt. %, from 0.7 to 2 wt. %, from 0.7 to 1.5 wt. %, from 0.7 to 1.0 wt. %, from 1.0 to 5 wt. %, from 1.0 to 2 wt. %, from 1.0 to 1.5 wt. %, from 1.5 to 5 wt. %, from 1.5 to 2 wt. %, from 2 to 5 wt. %, or approximately 0.8 wt. % nickel by weight of the titanium alloy.

The ceramic may include crystalline inorganic metal oxides, bauxite, kaolin, magnesium oxide, alumina, nitride, carbide, carbon, silicon, ground ceramic, zirconia, stabilized zirconia, mullite, zirconia toughened alumina, spinel, aluminosilicates (such as mullite or cordierite), silicon carbide, silicon nitride, titanium carbide, titanium nitride, aluminum oxide, silicon oxide, zirconium oxide, stabilized zirconium oxide, aluminum carbide, aluminum nitride, zirconium carbide, zirconium nitride, aluminum oxynitride, silicon aluminum oxynitride, silicon dioxide, aluminum titanate, tungsten carbide, tungsten nitride, steatite, or combinations thereof. The 3D printed proppant may include from 0 to 100 wt. % ceramic, by weight of the 3D printed proppant. In embodiments, the 3D printed proppant may include from 0 to 100 wt. %, from 0 to 90 wt. %, from 0 to 80 wt. %, from 0 to 70 wt. %, from 0 to 60 wt. %, from 0 to 50 wt. %, from 0 to 40 wt. %, from 0 to 30 wt. %, from 0 to 20 wt. %, from 0 to 10 wt. %, from 0 to 1 wt. %, from 1 to 100 wt. %, from 1 to 90 wt. %, from 1 to 80 wt. %, from 1 to 70 wt. %, from 1 to 60 wt. %, from 1 to 50 wt. %, from 1 to 40 wt. %, from 1 to 30 wt. %, from 1 to 20 wt. %, from 1 to 10 wt. %, from 10 to 100 wt. %, from 10 to 90 wt. %, from 10 to 80 wt. %, from 10 to 70 wt. %, from 10 to 60 wt. %, from 10 to 50 wt. %, from 10 to 40 wt. %, from 10 to 30 wt. %, from 10 to 20 wt. %, from 20 to 100 wt. %, from 20 to 90 wt. %, from 20 to 80 wt. %, from 20 to 70 wt. %, from 20 to 60 wt. %, from 20 to 50 wt. %, from 20 to 40 wt. %, from 20 to 30 wt. %, from 30 to 100 wt. %, from 30 to 90 wt. %, from 30 to 80 wt. %, from 30 to 70 wt. %, from 30 to 60 wt. %, from 30 to 50 wt. %, from 30 to 40 wt. %, from 40 to 100 wt. %, from 40 to 90 wt. %, from 40 to 80 wt. %, from 40 to 70 wt. %, from 40 to 60 wt. %, from 40 to 50 wt. %, from 50 to 100 wt. %, from 50 to 90 wt. %, from 50 to 80 wt. %, from 50 to 70 wt. %, from 50 to 60 wt. %, from 60 to 100 wt. %, from 60 to 90 wt. %, from 60 to 80 wt. %, from 60 to 70 wt. %, from 70 to 100 wt. %, from 70 to 90 wt. %, from 70 to 80 wt. %, from 80 to 100 wt. %, from 80 to 90 wt. %, or from 90 to 100 wt. % ceramic by weight of the 3D printed proppant. In embodiments where the 3D printed proppant includes ceramic, the 3D printed proppant may include from 0.5 to 10 wt. % ceramic fiber material. In such embodiments, the 3D printed proppant may include ceramic matrix composite including the ceramic fiber material. In embodiments, carbon nanotubes, graphite, or both may be included in the 3D printed proppant.

The ground ceramic may include calcined clay, un-calcined clay, bauxite, silica, alumina, geopolymer, or combinations thereof. The geopolymer may include an aluminosilicate including calcined clays, kaolinitic clays, lateritic clays, volcanic rocks, mine tailings, Hast furnace slag, coal fly ash, and combinations thereof. The geopolymer may be formed from a geopolymer precursor fluid including aluminosilicate and an alkaline reagent. The alkaline reagent may include sodium silicate solution and potassium silicate solution. The concentration of potassium hydroxide may be selected so that the ratio of $SiO_2$ to potassium oxide ($K_2O$) in the potassium silicate solution is in the range of about 0.5:1 to about 2:1, alternately in the range from about 0.5:1 to about 1:1, alternately in the range from 1:1 to about 2:1, and alternately in the range from about 1.5:1 to about 2:1, where the formula for potassium silicate is $K_2O(SiO_2)$. The Si to Al ratio may be in the range between 0.5:1 and 2:1. The geopolymer may have a silicon (Si) to aluminum (Al) ratio (Si/Al ratio) in the range between and 2:1, alternately between 1:1 and 2:1, alternately between 1:1 and 1.5:1, and alternately between 0.5:1 and 1:1. The aluminosilicate and the alkaline reagent, where sodium hydroxide is the alkaline reagent, may be mixed in stoichiometric amounts so that the ratio of $Al_2O_3$ to MIAS) is 1. In embodiments, the amount of aluminosilicate and the amount of the alkaline reagent, where potassium hydroxide is the alkaline reagent, are mixed in stoichiometric amounts so that the ratio of $Al_2O_3$ to $K_2O$ is 1. In embodiments, the ground ceramic may have an average particle size from 1 to 12 microns, from 1 to 10 microns, from 1 to 7 microns, from 1 to 5 microns, from 1 to 3 microns, from 3 to 12 microns, from 3 to 10 microns, from 3 to 7 microns, from 3 to 5 microns, from 5 to 12 microns, from 5 to 10 microns, from 5 to 7 microns, from 7 to 12 microns, from 7 to 10 microns, or from 10 to 12 microns. In embodiments, the ground ceramic may have a total alumina content from 30 to 90 wt. %, from 30 to 80 wt. %, from 30 to 70 wt. %, from 30 to 60 wt. %, from 30 to 50 wt. %, from 30 to 40 wt. %, from 40 to 90 wt. %, from 40 to 80 wt. %, from 40 to 70 wt. %, from 40 to 60 wt. %, from 40 to 50 wt. %, from 50 to 90 wt. %, from 50 to 80 wt. %, from 50 to 70 wt. %, from 50 to 60 wt. %, from 60 to 90 wt. %, from 60 to 80 wt. %, from 60 to 70 wt. %, from 70 to 90 wt. %, from 70 to 80 wt. %, or from 80 to 90 wt. %.

In certain implementations, the ground ceramic has total alumina content greater than 40 weight percent (wt. %). As for the ground ceramic mixture, the ground ceramic material may be mixed with a binder such as a poly(2-ethyl-2-oxazoline) solution, polyvinyl alcohol solution, waxes, or starch. The ground ceramic mixture may include the binder, for example at 0.1 wt. % to 1.5 wt. % of the amount of ceramic in the mixture.

A slurry having the ground ceramic mixture and water can be used. The ground-ceramic solid mixture combined with a liquid (for example, water) to form the slurry may have particle sizes in the range of 1 micron to 12 microns. The ground ceramic mixture may be mixed with water (for example, deionized water) to give the slurry, for instance, with 10% to 50% by weight of solids content. As mentioned, the ground ceramic may include reinforcing particles or fibers. The ground ceramic of the slurry may include a reinforcing agent (for example, reinforcing particles or fibers).

An example of a slurry that can be used is powder Alumina (25-30 vol %), Solvent such as ethyl alcohol (50-60 vol %), binder such as polyvinyl butyrol (1-5 vol %) and a plasticizer such as polyethylene glycol (5-10 vol %). In a different example water can replace the solvent to avoid the environmental issues. In aqueous based slurries, solid can be in the range from 25-75 vol % while water phase and the other additives are the remaining volume of the slurry.

After printing of these ceramic particles, they may be post cured to get strength. In ceramic proppants they may be sintered in an oven at temperature of 800-1400 C for 30 minutes to 2 hours to get the strength. At sintering temperature binder gets burned and smaller ceramic grain fuse with surrounding grains. The time required for sintering is such that the porosity created by 3D printing is not lost. It can be tailored by tailoring the time for sintering. The polymer may include resin, polyester, urea aldehyde, polyurethane, vinyl esters, furfural alcohol, or combinations thereof. The resin may include phenolic resin, epoxy resin, furan resin, polyurethane resin, polyurea resin, polyamide-imide resin, polyamide resin polyurea/polyurethane resin, urea-formaldehyde resin, melamin resin, silicone resin, vinyl ester resin, or combinations thereof. The 3D printed proppant may include from 0 to 100 wt. % polymer, by weight of the 3D printed proppant. In embodiments, the 3D printed proppant may include from 0 to 100 wt. %, from 0 to 90 wt. %, from 0 to 80 wt. %, from 0 to 70 wt. %, from 0 to 60 wt. %, from 0 to 50 wt. %, from 0 to 40 wt. %, from 0 to 30 wt. %, from 0 to 20 wt. %, from 0 to 10 wt. %, from 0 to 1 wt. %, from 1 to 100 wt. %, from 1 to 90 wt. %, from 1 to 80 wt. %, from 1 to 70 wt. %, from 1 to 60 wt. %, from 1 to 50 wt. %, from 1 to 40 wt. %, from 1 to 30 wt. %, from 1 to 20 wt. %, from 1 to 10 wt. %, from 10 to 100 wt. %, from 10 to 90 wt. %, from 10 to 80 wt. %, from 10 to 70 wt. %, from 10 to 60 wt. %, from 10 to 50 wt. %, from 10 to 40 wt. %, from 10 to 30 wt. %, from 10 to 20 wt. %, from 20 to 100 wt. %, from 20 to 90 wt. %, from 20 to 80 wt. %, from 20 to 70 wt. %, from 20 to 60 wt. %, from 20 to 50 wt. %, from 20 to 40 wt. %, from 20 to 30 wt. %, from 30 to 100 wt. %, from 30 to 90 wt. %, from 30 to 80 wt. %, from 30 to 70 wt. %, from 30 to 60 wt. %, from 30 to 50 wt. %, from 30 to 40 wt. %, from 40 to 100 wt. %, from 40 to 90 wt. %, from 40 to 80 wt. %, from 40 to 70 wt. %, from 40 to 60 wt. %, from 40 to 50 wt. %, from 50 to 100 wt. %, from 50 to 90 wt. %, from 50 to 80 wt. %, from 50 to 70 wt. %, from 50 to 60 wt. %, from 60 to 100 wt. %, from 60 to 90 wt. %, from 60 to 80 wt. %, from 60 to 70 wt. %, from 70 to 100 wt. %, from 70 to 90 wt. %, from 70 to 80 wt. %, from 80 to 100 wt. %, from 80 to 90 wt. %, or from 90 to 100 wt. % polymer by weight of the 3D printed proppant. In embodiments, ceramic or inorganic particles may be added to the polymer or resin to increase the toughness of the material. The 3D printed proppant may include from 0.1 to 20 wt. % inorganic or ceramic material by weight of the 3D printed proppant. It also help in reducing creep in the polymeric or resin based proppants. In embodiments, the ceramic or inorganic particles may include fibers. Resin is a substance of plant or synthetic origin that is typically convertible into polymers, and may be a mixture of organic compounds such as terpenes, an organic compound produced by plants. The viscosity of resin may be greater than 20 centiPoise (cP), measured at a temperature of 120° C. The resin may comprise phenolic resin, epoxy resin, furan resin, polyurethane resin, polyurea resin, polyester, polyamide-imide resin, polyamide resin polyurea/polyurethane resin, urea-formaldehyde resin, melamine resin, silicone resin, vinyl ester resin, or combinations of these. Novolacs are phenol-formaldehyde resins with a formaldehyde to phenol molar ratio of less than 1, where the phenol units are mainly linked by methylene or ether groups, or both. The novolac polymer may have a molecular weight of from 1,000 to 100,000 grams per mole (g/mol). The novolac polymer comprises a glass transition temperature greater than 250° F., 300° F., 350° F., 390° F., 400° F., 450° F., or 500° F. Novolacs are stable, meaning that novolacs do not react and do retain their polymer properties at temperatures of up to 300° F., 400° F., 425° F., 450° F., 475° F., 500° F., 550° F., or 600° F. Resoles are phenol-formaldehyde resins with a formaldehyde to phenol molar ratio of more than 1, where the phenol units are mainly linked by methylene or ether groups, or both. This can harden without the addition of a crosslinking agent due to abundance of methylene to bridge the phenol groups. The resole may have a molecular weight of from 1,000 to 100,000 grams per mole (g/mol). Resin or polymer inks may also be used. Resin or polymer inks are a photocurable polymer material, i.e., a "photopolymer" which may be cured on receiving light. Within technologies such as SLA, DLP, or even PolyJet, photosensitive liquid resins are used for manufacturing. These can be divided into two categories, thermoplastics and thermo-solids. These resins allow for objects to be printed with either matte or glossy finishes. The polymeric proppants are cured with hardened or crosslinked to get the thermoset material either at room temperature or by post curing at higher temperature in the oven. For example novolac resin is crosslinked with from 13 to 16 wt. % hexamine at from 200° F. to 400° F. to give fully cured thermoset proppant. In the present disclosure, the 3D printed proppant that includes polymer may have a glass transition temperature Tg, of greater than 150° F., greater than 200° F., greater than 250° F., greater than 300° F., greater than 350° F., or greater than 400° F., and less than 1000° F. Sometime Tg is also lowered due to temperature and the absorption of moisture and other fluids in the proppant. This has to be taken into account and testing need to be done prior to deployment in the field.

The 3D printed proppant may include reinforcing agents. In embodiments, the build material may include reinforcing agents. In embodiments, the ground ceramic may include reinforcing agents. The reinforcing agents may include comprise alumina, carbon, silicon carbide, alumina, mullite, organic materials, inorganic materials, ceramic materials, metallic materials, nanomaterials or combinations thereof. The organic materials may include carbon-based structures such as carbon nanotubes, single walled carbon nanotubes (SWNT), double walled nanotubes (DWNT), multi-walled carbon nanotubes (MWNT), armchair nanotubes, zig-zag nanotubes, helical nanotubes, bundles of single wall nanotubes, bundles of multi-wall nanotubes, nanofibers, nanorods, nanowires, nanospheres, microspheres, whiskers of oxide, fullerenes, graphene, carbon fibers, graphite fibers, nomex fibers, or combinations thereof. The inorganic materials may include vanadium pentoxide nanotubes, boron-nitride nanotube, tungsten, disulfidezinc oxide, diamond, clay, boron, boron nitride, silver, titanium dioxide, carbon, molybdenum disulfide, γ-aluminium oxide, titanium, palladium, tungsten disulfide, silicon dioxide, graphite, zirconium(IV) oxide-yttria stabilized, carbon, gd-doped-cerium (IV) oxide, nickel cobalt oxide, nickel(II) oxide, rhodium, sm-doped-cerium(IV) oxide, barium strontium titanate and silver. The nanomaterials may include nano-silica, nano-alumina, nano-zinc oxide, carbon nanotubes, nano-calcium carbonate, mica, vanadium pentoxide, boron nitride nanotubes, nano-zirconium oxide, or any of the reinforcing agents previously discussed at a nanoscale. The ceramic materials may include alumina, zirconia, stabilized zirconia, mullite, zirconia toughened alumina, spinel, aluminosilicates (such as mullite or cordierite), silicon carbide, silicon nitride, titanium carbide, titanium nitride, aluminum oxide, silicon oxide, zirconium oxide, stabilized zirconium oxide, aluminum carbide, aluminum nitride, zirconium carbide, zirconium nitride, aluminum oxynitride, silicon aluminum oxynitride, silicon dioxide, aluminum titanate, tungsten carbide, tungsten nitride, steatite, or any combination of these. The metallic materials may include iron, nickel, chromium, silicon, aluminum, copper, cobalt, beryllium, tungsten, molybdenum, titanium, magnesium, silver, as well as alloys of metals, and the like, or any combination of these. Metallic materials may also include the family of intermetallic materials, such as iron aluminides, nickel aluminides, and titanium aluminides. The reinforcing agents may include coated carbon nanotubes, such as zinc sulfide (ZnS) coated carbon nanotubes. The reinforcing agents may include particles, fibers, or both. The particles may have a particles size from 1 to 50 microns, from 1 to 40 microns, from 1 to 30 microns, from 1 to 20 microns, from 1 to 10 microns, from 10 to 50 microns, from 10 to 40 microns, from 10 to 30 microns, from 10 to 20 microns, from 20 to 50 microns, from 20 to 40 microns, from 20 to 30 microns, from 30 to 50 microns, from 30 to 40 microns, or from 40 to 50 microns. The fibers may have an aspect ratio of greater than 1:2. The aspect ratio of a fiber is the ratio of the length of the fiber to the diameter of the fiber. The 3D printed proppant may include from 10 to 75 wt. %, from 10 to 70 wt. %, from 10 to 60 wt. %, from 10 to 50 wt. %, from 10 to 40 wt. %, from 10 to 30 wt. %, from 10 to 20 wt. %, from 20 to 75 wt. %, from 20 to 70 wt. %, from 20 to 60 wt. %, from 20 to 50 wt. %, from 20 to 40 wt. %, from 20 to 30 wt. %, from 30 to 75 wt. %, from 30 to 70 wt. %, from 30 to 60 wt. %, from 30 to 50 wt. %, from 30 to 40 wt. %, from 40 to 75 wt. %, from 40 to 70 wt. %, from 40 to 60 wt. %, from 40 to 50 wt. %, from 50 to 75 wt. %, from 50 to 70 wt. %, from 50 to 60 wt. %, from 60 to 75 wt. %, from 60 to 70 wt. %, or from 70 to 75 wt. % reinforcing agents by weight of build material.

ZnS coated carbon nanotubes provide additional thermal stability and mechanical strength. The ZnS coated multi-walled carbon nanotubes retain significantly greater weight in thermo-gravimetric analysis (TGA) test compared to multi-walled carbon nanotubes without a ZnS coating. The article titled *Carbon fiber/epoxy composites: effect of zinc sulphide coated carbon nanotube on thermal and mechanical properties* by G. K. Maron, et al., originally published Jul. 7, 2017, and available from *Polym. Bull.* 75, 1619-1633 (2018). https://doi.org/10.1007/s00289-017-2115-v shows this phenomenon where it states that: "FIG. 4a shows the decomposition behavior as a function of temperature of the MWCNT, MWCNTf, and MWCNTf-ZnS powders. The untreated MWCNT showed a thermal stability up to 510° C., being fully degraded at 580° C. The MWCNTf and MWCNTf-ZnS that have suffered an acid treatment started to lose weight at lower temperatures, due to the presence of functional groups bounded to the carbonic structure. The MWCNTf presented the lower stability, mainly due to the presence of more defects in its structure, caused by the functionalization process. From the three tested samples, the MWCNT-ZnS had the better results. The thermal stability of the MWCNTf-ZnS was up to 580° C., with the carbonic structure being fully degraded at 620° C. At higher temperatures, only the sulphide particles have resisted to the thermal exposure and not suffered degradation." The coexistence of nanotubes and graphene fillers shows a distinct synergistic effect in improving the tensile properties. It is contemplated that the combination of nanotubes and graphene synergistically reinforce the polymer matrix is ascribed to the strong interfacial interaction between filler and matrix and the nanotube-graphene interconnections. Specifically, the molecular couplings between the nanotubes and graphene may transfer load when the proppant particle is under stress. Not intending to be limited by theory, the reduction in tensile strength may be dependent on the degree of defects introduced to the multi-walled carbon nanotubes and epoxy interfaces. The Young's modulus is at its greatest value when the amount of reinforcing agents is approximately 0.1 to 10 wt. % by weight of build material, which is desired for proppant application. Data showing such results may be found in U.S. Patent Application Publication US-2019-0345377-A1, which is incorporated by reference herein.

The slurry paste for the 3D printed proppant may include less than or equal to 5 weight percent (wt. %), 2 wt. %, 1.5 wt. %, 1 wt. %, 0.75 wt. %, 0.5 wt. %, 0.2 wt. %, or 0.1 wt. % of the nano-reinforcing agent. The nano-reinforcing agent may include ceramic materials, metallic materials, organic materials, inorganic materials, mineral-based materials or any combination of these. In some embodiments, the nano-reinforcing agent comprises at least one of nano-silica, nano-alumina, nano-zinc oxide, carbon nanotubes, nano-calcium carbonate, mica, vanadium pentoxide, boron nitride nanotubes, or nano-zirconium oxide. Ceramic materials include, but are not limited to, alumina, zirconia, stabilized zirconia, mullite, zirconia toughened alumina, spinel, aluminosilicates (such as mullite or cordierite), silicon carbide, silicon nitride, titanium carbide, titanium nitride, aluminum oxide, silicon oxide, zirconium oxide, stabilized zirconium oxide, aluminum carbide, aluminum nitride, zirconium carbide, zirconium nitride, aluminum oxynitride, silicon aluminum oxynitride, silicon dioxide, aluminum titanate, tungsten carbide, tungsten nitride, steatite, or any combination of these. Metallic materials include, but are not limited to, iron, nickel, chromium, silicon, aluminum, copper, cobalt, beryllium, tungsten, molybdenum, titanium, magnesium, silver, as well as alloys of metals, and the like, or any combination of these. Metallic materials may also include the family of intermetallic materials, such as iron aluminides, nickel aluminides, and titanium aluminides.

Reinforcing the resin matrix by mixing in two nano-reinforcing agents may increase the proppant crush resistance performance. The two nano-reinforcing agents may include: (1) the nano-reinforcing agent in the form of tubes, fibers, rope, fibrils, or combinations of these dispersed in the proppant slurry and bonded to (2) the nano-reinforcing agent in the form of platelets, 2-Dimensional (2D) surface, ribbons, or combinations of these. In some embodiments, the two nano-reinforcing agents may include carbon nanotubes (which have an aspect ratio of greater than 100) and graphene (which provides a 2D planar surface) adds mechanical bridging throughout the proppant. This synergistic effect further improves electrical conductivity as compared to a proppant including carbon nanotubes without graphene.

In embodiments, the 3D printed proppant may include a surface modifier. The build material may include a surface modifier that imparts hydrophobic or oleophobic characteristics to the proppant. This reduces the interfacial tension and prevents condensate or water blockage in the wellbore, increasing gas relative permeability and thereby reducing condensate banking. The surface modifier may also impart hydrophobic or oleophobic characteristics to the proppant, such that water will not wet the surface, which decreases the degradation of the proppants due to contact with water. These wettability characteristics enhance the load recovery of hydraulic fracturing fluid or water after fracturing operation as the hydrocarbons will experience less friction from contact with the proppant. This increases the rate of hydrocarbon production and the overall amount of hydrocarbon production. The surface modifier may comprise at least one of an alkyl fluorosilane solution, a fluorinated surfactant, a fluorinated polymer, and a fluorinated polymeric surfactant. The alkyl fluorosilane solution may comprise triethoxy(tridecafluorooctyl)silane. The 3D printed proppant may include from 1 to 10 volume percent (vol. %), from 1 to 8 vol. %, from 1 to 5 vol. %, from 1 to 3 vol. %, from 3 to 10 vol. %, from 3 to 8 vol. %, from 3 to 5 vol. %, from 5 to 10 vol. %, from 5 to 8 vol. %, or from 8 to 10 vol. % surface modifier by volume of the build material.

In embodiments, the build material may include additives to facilitate sintering and to increase the mechanical strength of the 3D printed proppant. These additives may include, for example, a sintering aid, dispersants, mullite growth promoter, organic fibers, inorganic fibers, organic particles, and inorganic particles. The sintering aid may include, for example, iron(II) oxide or ferrous oxide (FeO), iron(III) oxide ($Fe_2O_3$), iron(II, III) oxide ($Fe_3O_4$), magnesium oxide (MgO), zinc oxide (ZnO), manganese(II) oxide (MnO), and manganese(III) oxide ($Mn_2O_3$). The sintering aid may be ground to size of 1 micron to 25 microns. Other sintering aids include bentonite clay, feldspar, talc, titanium oxide and compounds of lithium, sodium, magnesium, potassium, calcium, manganese, boron, lithium carbonate, sodium oxide, sodium carbonate, sodium silicate, magnesium oxide, magnesium carbonate, calcium oxide, calcium carbonate, manganese oxide, boric acid, boron carbide, aluminum dibromide, boron nitride, and boron phosphide. The 3D printed proppant may include from 0.1 to 15 wt. %, from 0.1 to 12 wt. %, from 0.1 to 10 wt. %, from 0.1 to 8 wt. %, from 0.1 to 5 wt. %, from 0.1 to 3 wt. %, from 0.1 to 1 wt. %, from 1 to 15 wt. %, from 1 to 12 wt. %, from 1 to 10 wt. %, from 1 to 8 wt. %, from 1 to 5 wt. %, from 1 to 3 wt. %, from 3 to 15 wt. %, from 3 to 12 wt. %, from 3 to 10 wt. %, from 3 to 8 wt. %, from 3 to 5 wt. %, from 5 to 15 wt. %, from 5 to 12 wt. %, from 5 to 10 wt. %, from 5 to 8 wt. %, from 8 to 15 wt. %, from 8 to 12 wt. %, from 8 to 10 wt. %, from 10 to 15 wt. %, from 10 to 12 wt. %, or from 12 to 15 wt. % additives by weight of the build material. In embodiments, the 3D printed proppant may include from 0.1 to 15 wt. %, from 0.1 to 12 wt. %, from 0.1 to 10 wt. %, from 0.1 to 8 wt. %, from 0.1 to 5 wt. %, from 0.1 to 3 wt. %, from 0.1 to 1 wt. %, from 1 to 15 wt. %, from 1 to 12 wt. %, from 1 to 10 wt. %, from 1 to 8 wt. %, from 1 to 5 wt. %, from 1 to 3 wt. %, from 3 to 15 wt. %, from 3 to 12 wt. %, from 3 to 10 wt. %, from 3 to 8 wt. %, from 3 to 5 wt. %, from 5 to 15 wt. %, from 5 to 12 wt. %, from 5 to 10 wt. %, from 5 to 8 wt. %, from 8 to 15 wt. %, from 8 to 12 wt. %, from 8 to 10 wt. %, from 10 to 15 wt. %, from 10 to 12 wt. %, or from 12 to 15 wt. % sintering aid by weight of the build material.

In embodiments, the 3D printed proppant may include a coupling agent. The build material may include a coupling agent. A coupling agent is a compound that provides a chemical bond between two dissimilar materials, such as an inorganic material and an organic material. The coupling agent may form a bond between the filler and polymer matrix. In some embodiments, the coupling agent may comprise at least one of 3-glycidoxypropyltrimethoxysilane, 3-aminopropyltriethoxysilane, 3-aminopropyltrimethoxysilane, and 3-chloropropyltrimethoxysilane. The 3D printed proppant may comprise from 0.1 to 20 vol. %, from 0.1 to 15 vol. %, from 0.1 to 10 vol. %, from 0.1 to 5 vol. %, from 0.1 to 1 vol. %, from 1 to 20 vol. %, from 1 to 15 vol. %, from 1 to 10 vol. %, from 1 to 5 vol. %, from 5 to 20 vol. %, from 5 to 15 vol. %, from 5 to 10 vol. %, from 10 to 20 vol. %, from 10 to 15 vol. %, or from 15 to 20 vol. % coupling agent by volume of build material.

In embodiments, the 3D printed proppant may include a tracer material. The build material may include a tracer material. The tracer material may include ionic contrast agents such as thorium dioxide (ThO2), barium sulfate (BaSO4), diatrizoate, metrizoate, iothalamate, and ioxaglate; and non-ionic contrast agents such as iopamidol, iohexol, ioxilan, iopromide, iodixanol, and ioversol. Furthermore, the 3D printed proppant may include from 0.001 to 5.0 wt. %, from 0.001 to 3.0 wt. %, from 0.001 to 1.0 wt. %, from 0.001 to 0.1 wt. %, from 0.1 to 5.0 wt. %, from 0.1 to 3.0 wt. %, from 0.1 to 1.0 wt. %, from 1.0 to 5.0 wt. %, from 1.0 to 3.0 wt. %, or from 3.0 to 5.0 wt. % tracer material by weight of build material.

In embodiments, the 3D printed proppant may include a crosslinker. The build material may include a crosslinker. A crosslinker is a substance or agent that induces the subsurface formation of crosslinks. Mixing an unpolymerized or partially polymerized resin with a crosslinker results in a chemical reaction that crosslinks the resin. A crosslinked 3D printed proppant particle may retain its shape without dissolving in the hydraulic fracturing fluid. The degree of crosslinking may be controlled by the molar or weight ratio of crosslinker to monomer. In some embodiments, the crosslinker may comprise at least one of hexamethylenetetramine, paraformaldehyde, oxazolidines, melamine resins, aldehyde donors, or resole polymers. 3D printed proppant may include from 8 to 20 wt. %, 8 to 18 wt. %, from 8 to 15 wt. %, from 8 to 13 wt. %, from 8 to 10 wt. %, from 10 to 20 wt. %, from 10 to 18 wt. %, from 10 to 15 wt. %, from 10 to 13 wt. %, from 13 to 20 wt. %, from 13 to 18 wt. %, from 13 to 15 wt. %, from 15 to 20 wt. %, from 15 to 18 wt. %, or from 18 to 20 wt. % crosslinker by weight of the build material. In embodiments, the method may include crosslinking the 3D printed proppant particles by heating from 350° F. to 450° F., from 375° F. to 450° F., from 400° F. to 450° F., from 425° F. to 450° F., from 350° F. to 425° F., from 375° F. to 425° F., from 400° F. to 425° F., from 350° F. to 400° F., from 375° F. to 400° F., or from 350° F. to 375° F. for from 3 to 8 minutes (min), from 3 to 6 min, from 3 to 5 min, from 4 to 8 min, from 4 to 6 min, from 4 to 5 min, from 5 to 8 min, from 5 to 6 min, or approximately 5 min.

In embodiments, the 3D printed proppant may include an accelerating agent. The build material may include an accelerating agent. The accelerating agent may include at least one of hydrochloric acid, Lewis acid, boron trifluoride etherate, zinc or manganese ions, acetic acid, carboxylic acid, bases, such as sodium hydroxide, or salts, such as zinc acetate. The 3D printed proppant may include from 1 to 70 wt. %, from 1 to 45 wt. %, from 1 to 20 wt. %, from 1 to 12 wt. %, from 5 to 70 wt. %, from 5 to 45 wt. %, from 5 to 20 wt. %, from 5 to 12 wt. %, from 12 to 70 wt. %, from 12 to 45 wt. %, or from 12 to 20 wt. % accelerating agent by weight of the build material.

In embodiments, the 3D printed proppant may include a diluent. The build material may include a diluent. Diluents are low-molecular-weight, low-viscosity compounds that are used to reduce the viscosity or enhance the solubility of a resin and/or hardener. Diluents may be either reactive or non-reactive. Epoxy diluents, for example, are formulated together with epoxy resins to reduce the viscosity and still remain 100% solids. Normally, solvents would be used to reduce viscosity, but most organic solvents are now being disallowed because of their high volatile emissions. Some long-chain aliphatic reactive diluents can also improve the flexural strength of epoxy adhesives. Examples of reactive diluents for epoxy resins include: phenylglycidyl ether, butylglycidyl ether, allylglycidyl ether, butanediol diglycidyl ether, cresyl glycidyl ether, alkyl glycidyl ether, 2-ethyl hexyl glycidyl ether, aliphatic polyglycidyl ether and glycerol-based epoxy resins. For phenolic resin, diluents may include ethylene glycol benzylic alcohol, benzylic ether, 1,3-butylene glycol, monoallyl or methylallyl ethers of poly(methylol) alkanes, monoallyl ether of glycerine, allyl or methallyl glycidyl ether, N-acylated arylamine, N-acylated naphthylamine, N-substituted arylsulfonamide, and N-substituted arylamine. The 3D printed proppant may include from 0.1 to 20 wt. %, from 0.1 to 15 wt. %, from 0.1 to 10 wt. %, from 0.1 to 5 wt. %, from 0.1 to 1 wt. %, from 1 to 20 wt. %, from 1 to 15 wt. %, from 1 to 10 wt. %, from 1 to 5 wt. %, from 5 to 20 wt. %, from 5 to 15 wt. %, from 5 to 10 wt. %, from 10 to 20 wt. %, from 10 to 15 wt. %, or from 15 to 20 wt. % diluent by weight of the build material.

As stated previously, the method may further include depositing a layer of binder material on the layer of build material. The binder material may include metal, ceramic, heavy fuel oil, boron nitride, oxynitride glass, aluminum carbide ($Al_2C_3$), silicon carbide ($SiC_2$) aluminum nitride (AlN), bismuth tertroxide ($Bi_2O_3$), boron oxide ($B_2O_3$), zirconia ($ZrO_2$), silica ($SiO_2$), rare earth oxides, poly(2-ethyl-2-oxazoline) solution, polyvinyl alcohol solution, waxes, starch, or combinations thereof. The binder material have a relatively low melting-point, such as a melting point less than 400° C., less than 500° C., or less than 600° C. In embodiments, photo-curable binder, or inorganic binder. The bonding additive may be an inorganic binder powder that may include a metal, an intermetallic compound, or a ceramic, or mixtures thereof. In embodiments, the 3D printed proppant may include from 0.1 to 1.5 wt. %, from 0.1 to 1.2 wt. %, from 0.1 to 1.0 wt. %, from 0.1 to 0.8 wt. %, from 0.1 to 0.5 wt. %, from 0.1 to 0.3 wt. %, from 0.3 to 1.5 wt. %, from 0.3 to 1.2 wt. %, from 0.3 to 1.0 wt. %, from 0.3 to 0.8 wt. %, from 0.3 to 0.5 wt. %, from 0.5 to 1.5 wt. %, from 0.5 to 1.2 wt. %, from 0.5 to 1.0 wt. %, from 0.5 to 0.8 wt. %, from 0.8 to 1.5 wt. %, from 0.8 to 1.2 wt. %, from 0.8 to 1.0 wt. %, from 1.0 to 1.5 wt. %, from 1.0 to 1.2 wt. %, or from 1.2 to 1.5 wt. % binder material by weight of build material.

The method further includes curing the binder material within the 3D printing apparatus and repeating as necessary to produce the 3D printed proppant. material undergoes a heat treatment to a certain temperature, is kept there for a definite time, and is then cooled to room temperature in order to alter the material properties. The annealing process is time and temperature dependent. Annealing of polymers is a heating of a polymeric part to below its glass transition temperature in order to relieve the internal stresses introduced during its fabrication (molding, cooling after molding, machining, welding, etc.). Thermal annealing is a simple route for stabilizing glassy polymers via the densification of their polymer chains and is accomplished through thermal treatment of the glassy thermoplastics. For amorphous polymers, the thermal treatment can play a very important role in changing the morphology. If the temperature is lower than the glass transition temperature Tg, the polymer chains are mainly immobile, thereby maintaining the existing morphology; however, if the annealing temperature is greater than the Tg, the polymer chains will relax. It has been found that the morphology can be modified upon annealing at a temperature higher than the Tg, thus changing the physical properties of the polymers.

As previously described, proppants are propping agent particles used in hydraulic fracturing fluids to maintain and hold open subsurface fractures during or following subsurface treatment. Tensile strength is the resistance of a material to breaking under tension. A material with a greater tensile strength suffers less fracturing at a given tension as compared to a material with a lesser tensile strength. The 3D printed proppant of the present disclosure may have a tensile strength of from 5 to 3000 Mega Pascals (MPa), from 200 to 2000 from 200 to 1500 MPa, from 200 to 1300 MPa, from 200 to 1200 MPa, from 200 to 1100 MPa, from 200 to 1000 MPa, from 200 to 800 MPa, from 200 to 600 MPa, from 200 to 500 MPa, from 200 to 450 MPa, from 200 to 400 MPa, from 400 to 2000 MPa, from 400 to 1500 MPa, from 400 to 1300 MPa, from 400 to 1200 MPa, from 400 to 1100 MPa, from 400 to 1000 MPa, from 400 to 800 MPa, from 400 to 600 MPa, from 400 to 500 MPa, from 400 to 450 MPa, from 450 to 2000 MPa, from 450 to 1500 MPa, from 450 to 1300 MPa, from 450 to 1200 MPa, from 450 to 1100 MPa, from 450 to 1000 MPa, from 450 to 800 MPa, from 450 to 600 MPa, from 450 to 500 MPa, from 500 to 2000 MPa, from 500 to 1500 MPa, from 500 to 1300 MPa, from 500 to 1200 MPa, from 500 to 1100 MPa, from 500 to 1000 MPa, from 500 to 800 MPa, from 500 to 600 MPa, from 600 to 2000

MPa, from 600 to 1500 MPa, from 600 to 1300 MPa, from 600 to 1200 MPa, from 600 to 1100 MPa, from 600 to 1000 MPa, from 600 to 800 MPa, from 800 to 2000 MPa, from 800 to 1500 MPa, from 800 to 1300 MPa, from 800 to 1200 MPa, from 800 to 1100 MPa, from 800 to 1000 MPa, from 1000 to 2000 MPa, from 1000 to 1500 MPa, from 1000 to 1300 MPa, from 1000 to 1200 MPa, from 1000 to 1100 MPa, from 1100 to 1500 MPa, from 1100 to 1300 MPa, from 1100 to 1200 MPa, from 1200 to 1500 MPa, from 1200 to 1300 MPa, from 1300 to 1500 MPa, approximately 480 MPa, or approximately 1170 MPa, meaning that the 3D printed proppant will not fracture until its tensile strength has been exceeded.

As previously discussed, proppants with a relatively low density may be in situations where high pump rates or carrier fluids with low viscosities are needed. In embodiments, the 3D printed proppant may have a density of less than 2.5 grams per cubic centimeter (g/cc). The 3D printed proppant may have a density of from 0.7 to 3.0 g/cc, from 0.7 to 2.5 g/cc, from 0.7 to 2.3 g/cc, from 0.7 to 2.2 g/cc, from 0.7 to 2.0 g/cc, from 0.7 to 1.8 g/cc, from 0.7 to 1.5 g/cc, from 1.5 to 3.0 g/cc, from 1.5 to 2.5 g/cc, from 1.5 to 2.3 g/cc, from 1.5 to 2.2 g/cc, from 1.5 to 2.0 g/cc, from 1.5 to 1.8 g/cc, from 1.8 to 2.5 g/cc, from 1.8 to 2.3 g/cc, from 1.8 to 2.2 g/cc, from 1.8 to 2.0 g/cc, from 2.0 to 3.0 g/cc, from 2.0 to 2.5 g/cc, from 2.0 to 2.3 g/cc, from 2.0 to 2.2 g/cc, from 2.2 to 2.5 g/cc, from 2.2 to 2.3 g/cc, from 2.3 to 2.5 g/cc, from 2.5 to 3.0 g/cc, or approximately 2.25 g/cc.

Embodiments of the present disclosure may utilize at least one 3D printed proppant particle and in embodiments in which more than one 3D printed proppant particle is used, the 3D printed proppant particles may contain a mixture of two or more different materials. A hydraulic fracturing fluid and a method for increasing a rate of hydrocarbon production from a subsurface formation is also disclosed. A hydraulic fracturing fluid may be used to propagate fractures within a subsurface formation and further open fractures. The hydraulic fracturing fluid may include water, a clay-based component, and the 3D printed proppants disclosed in this disclosure. The clay-based component may include one or more components selected from the group consisting of lime (CaO), $CaCO_3$, bentonite, montmorillonite clay, barium sulfate (barite), hematite ($Fe_2O_3$), mullite ($3Al_2O_3 \cdot 2SiO_2$ or $2Al_2O_3 \cdot SiO_2$), kaolin, ($Al_2Si_2O_5(OH)_4$ or kaolinite), alumina ($Al_2O_3$, or aluminum oxide), silicon carbide, tungsten carbide, or combinations thereof. 3D printed proppants within the hydraulic fracturing fluid may aid in treating subsurface fractures, to prop open and keep open the fracture. The method may include producing a first rate of production of hydrocarbons from the subsurface formation, in which the hydrocarbons comprise a first interfacial tension, introducing a hydraulic fracturing fluid comprising the 3D printed proppants into the subsurface formation, and increasing hydrocarbon production from the subsurface formation by producing a second rate of production of hydrocarbons from the subsurface formation, in which the second rate of production of hydrocarbons is greater than the first rate of production of hydrocarbons.

The hydraulic fracturing fluid in the subsurface fracture may comprise 3D printed proppants suspended in the hydraulic fracturing fluid. In some embodiments, the 3D printed proppants may be distributed throughout the hydraulic fracturing fluid. The hydraulic fracturing fluid may be pumped into the subsurface formation or may be otherwise contacted with the subsurface formation.

Embodiments of methods of treating a subsurface formation may include propagating at least one subsurface fracture in the subsurface formation to treat the subsurface formation. In some embodiments, the subsurface formation may be a rock or shale subsurface formation. In some embodiments, contacting of the subsurface formation may include drilling into the subsurface formation and subsequently injecting the hydraulic fracturing fluid into at least one subsurface fracture in the subsurface formation. In some embodiments, the hydraulic fracturing fluid may be pressurized before being injected into the subsurface fracture in the subsurface formation.

In embodiments, the 3D printed proppant may be made using metal alloys, including metallic ink. 3D printed metallic structures are used in a broad range of applications. Metal printed parts have higher strength and hardness and are often more flexible than parts that are manufactured using a traditional method. However, they are more prone to fatigue. To print metallic bodies, the most commonly used commercial manufacturing technologies are powder-bed approaches such as selective laser sintering/melting (SLS/SLM) and electron beam melting (EBM) according to the fusion mechanism and energy source. In these technologies, fine micro scale metal powders are tightly compacted to form a powder bed. A high-intensity laser or electron beam selectively scans the pow-der particles to fuse them layer-by-layer. Once completed, the fused part is removed from the powder bed and thoroughly cleaned by removing the loose or partially sintered powders. A direct energy deposition (DED), where a focused energy beam is utilized to fuse the metallic materials as they are being deposited can be used to print 3D metal bodies. Another method used by Skylar-Scott et al. they sintered water-based silver inks using a focused laser as they were being extruded from the nozzle.

Solvent-cast 3D printing (SC-3DP) consists of an ink paste containing metal powders, polymer and volatile solvent, in which no lasers or power beds are required. The metallic ink is extruded through a micro nozzle under an applied pressure. The volatile solvent evaporates rapidly upon extrusion as a result of the pressure drop. The polymer solidifies and the rigidity of the extruded ink filament increases, which allows it to hold its shape and support the subsequent layers. The result is a metal/polymer composite 3D structure.

Another method is using a water-based polymer solution to prepare metallic inks for SC-3DP, which is comprised of deionized water, polyvinyl alcohol (PVA) binder and polyethylene glycol (PEG) plasticizer.

Another method, alloys powders are uniformly mixed with a water-based polymer solution using a ball mill machine. The metallic paste, referred to the ink, is loaded into a syringe barrel and extruded through a tapered-micro nozzle under a specific pressure at room temperature. A fan blows air over the extruded ink filament to accelerate solvent evaporation. The chitosan is 90% deacetylated with an average molecular weight of 207 kDa. 0.8 g chitosan is dissolved in 10 mL 80 vol % acetic acid/deionized water. The chitosan solution is mixed using a ball mill mixer (8000M mixer/Mill) for 10 min. After mixing, it is sealed and stored in a refrigerator. The metallic ink is prepared by mixing chitosan/acid solution with HAS powders at a weight ratio of 1:6.5 using the ball-mill for 5 min.

SLM and DMLS can produce parts from a large range of metals and metal alloys including aluminum, stainless steel, titanium, cobalt chrome and Inconel. A key strength of metal 3D printing is its compatibility with high strength materials, such as nickel or cobalt-chrome superalloys, that are very difficult to process with traditional manufacturing methods. Common materials includes aluminum alloys (Good mechanical & thermal properties, Low density, Good electrical conductivity but has Low hardness), Stainless steel & tool steel (High wear resistance, Great hardness, Good ductility and weldability), Titanium alloys (Corrosion resistance, Excellent strength-to-weight ratio, Low thermal expansion, Biocompatible), Cobalt-Chrome superalloys (Excellent wear & corrosion resistance, Great properties at elevated temperatures, Very high hardness, Biocompatible) and Nickel superalloys (Inconel) (Excellent mechanical properties, High corrosion resistance, Temperature resistant up to 1200° C., Used in extreme environments)

Compulsory post-processing steps include the removal of the loose powder and the support structures, while heat treatment (thermal annealing) is commonly used to relieve the residual stresses and improve the mechanical properties of the part. 3D Printing of a hybrid system including two or more of the above described Ceramocs, Metal Alloys and Polymers. A three-dimensional (3D) printer is an apparatus for manufacturing a 3D shape by spraying inks with specific materials including a powder type one by one and laminating thereof to minute thicknesses. 3D printing can be performed using a computer-controlled 3-axis positioning robot (such as I&J2200-4, I&J Fisnar) and a pressure dispensing system (HP-7X, EFD). The metallic ink is loaded into a syringe (3 mL, Nordson EFD) attached with a smooth flow tapered nozzle (exit inner diameter=250 μm). A liquid 3D printer uses a UV light to solidify photopolymer resin while an FDM 3D printer, which extrudes melted plastic through a heated nozzle. Fused Deposition Modeling (FDM), also known by its non-trademarked term, fused filament fabrication (FFF), is one of the most popular 3D printing methods. Selective Laser Sintering (SLS) is an additive manufacturing process that involves the fusing of plastic powdered material using a powerful laser. With a combination of high accuracy, speed, reliability and lack of support structures, SLS is used both for functional prototyping and low-volume production. Stereolithography (SLA) is the formal name of the technology behind liquid 3D printers. Traditional SLA printers consist of a build platform in a vat of liquid photopolymer resin. A UV laser focused on the surface of the resin precisely draws each layer. Then the build platform is lowered, and a blade spreads the resin over the top of the previous layer so that the next layer can be drawn. Other liquid 3D printer versions now exist, including inverted SLA printers and digital light processing (DLP) printers. The inverted SLA printers address the problem of large vats by printing "upside down". The laser focuses up through the bottom of a resin tank, which has a transparent bottom, and the build plate lifts up out of the resin tank one layer at a time. This makes it possible to print with only a small volume of resin in the tank. Since a laser beam controls the geometry of the printed object, SLA printers are capable of much finer resolution than FDM printers, in which the resolution is limited by the diameter of the nozzle. With a liquid 3D printer, resolutions can be as high as 20 microns, whereas an FDM printer will typically linger around 50 to 100 microns. That means fewer layer lines and a high amount of detail.

EXAMPLES

The following examples illustrate features of the present disclosure but is not intended to limit the scope of the disclosure. Four proppant particles were 3D printed in accordance with the embodiments previously described.

Example 1

A titanium alloy proppant having a particle size of 400 microns (40 mesh) was 3D printed using DMP Flex 350, available from 3D Systems. The titanium alloy was Ti-8Mo-8V-2Fe-3Al, meaning that the titanium alloy included 79 wt. % titanium, 8 wt. % molybdenum, 8 wt. % vanadium, 2 wt. % iron, and 3 wt. % aluminum. The Ti-8Mo-8V-2Fe-3Al titanium alloy was available from SteelGr, China Steel Suppliers. The titanium alloy had a density of approximately 4.5 g/cm$^3$. The 3D printed proppant included a core, support bars, and a shell, where each of the core, support bars, and shell were made of the titanium alloy. The diameter of the core was 150 microns. The length of the support bars was each 85 microns. The inner diameter of the shell was 320 microns. The shell was 40 microns thick. The 3D printed proppant had a tensile strength of approximately 1170 mPa (170000 psi). The tensile strength was measured using an Instron 5966, available from Instron, headquartered in Norwood, Massachusetts. The 3D proppant had a density of from 1.8 to 2.5 g/cm$^3$.

Example 2

A titanium alloy proppant having a particle size of 1190 microns (16 mesh) was 3D printed using DMP Flex 350, available from 3D Systems. The titanium alloy was Ti-8Mo-8V-2Fe-3Al, meaning that the titanium alloy included 79 wt. % titanium, 8 wt. % molybdenum, 8 wt. % vanadium, 2 wt. % iron, and 3 wt. % aluminum. The titanium alloy was SteelGr, available from China Steel Suppliers. The titanium alloy had a density of approximately 4.5 g/cm$^3$. The 3D printed proppant included a hollow core, support bars, and a shell, where each of the hollow core, support bars, and shell were made of the titanium alloy. The inner diameter of the hollow core was 200 microns and the outer diameter of the hollow core was 600 microns. The support bars each had a length of 200 microns. The inner diameter of the shell was 990 microns. The shell had a thickness of 100 microns. The 3D proppant had a density of approximately 1.98 g/cc.

Example 3

A titanium alloy proppant having a particle size of 210 microns (70 mesh) was 3D printed using a DMP Flex 350 available from 3D Systems. The titanium alloy was Ti-8Mo-8V-2Fe-3Al, meaning that the titanium alloy included 79 wt. % titanium, 8 wt. % molybdenum, 8 wt. % vanadium, 2 wt. % iron, and 3 wt. % aluminum. The titanium alloy had a density of approximately 4.5 g/cm$^3$. The 3D printed proppant included a porous core and a shell, where each of the porous core and the shell were made of the titanium alloy. The diameter of the porous core was 150 microns. The porous core had a porosity of 50%. The inner diameter of the shell was 150 microns. The 3D printed proppant had a tensile strength of approximately 1170 mPa (170000 psi). The tensile strength was measured using an Instron 5966, available from Instron, headquartered in Norwood, Massachusetts Example 4

A titanium alloy proppant having a particle size of 595 microns (30 mesh) was 3D printed using a DMP Flex 350 available from 3D Systems. The titanium alloy was Ti-0.3Mo-0.8Ni, meaning that the titanium alloy included 99.1 wt. % titanium, 0.3 wt. % molybdenum, and 0.8 wt. % nickel. The titanium alloy had a density of approximately 4.5 g/cm$^3$. The 3D printed proppant included a porous core and a shell, where each of the porous core and the shell were made of the titanium alloy. The porous core had a porosity of 50%. The 3D printed proppant had a tensile strength of approximately 480 MPa (70,000 psi). The tensile strength was measured using an Instron 5966, available from Instron, headquartered in Norwood, Massachusetts. The 3D proppant had a density of approximately 2.25 g/cm³.

Example 5

A titanium alloy proppant having a particle size of 595 microns (30 mesh) was 3D printed using a DMP Flex 350 available from 3D Systems. The titanium alloy was Laserform® Ti Gr23 (A) available from 3D Systems. The Laserform® Ti Gr23 (A) titanium alloy included 88.6 wt. % titanium, 0.03 wt. % nickel, 0.08 wt. % carbon, 0.25 wt. % iron, 6.5 wt. % aluminum, and 4.5 wt. % vanadium. The titanium alloy had a density of approximately 4.42 g/cm³. The 3D printed proppant was a porous particle with a porosity of 50%. The 3D printed proppant had a tensile strength of approximately 480 MPa (70,000 psi). The tensile strength was measured using an Instron 5966, available from Instron, headquartered in Norwood, Massachusetts. The 3D proppant had a density of approximately 2.25 g/cm³.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A 3D printed proppant comprising:
a core;
support bars extending from the core to a shell; and
the shell encapsulating the core and the support bars, wherein:
the support bars have a length of from 85 micrometers to 200 micrometers,
the core comprises metal, polymer, ceramic, composite, or combinations thereof,
the support bars comprise metal, polymer, ceramic, composite, or combinations thereof,
the shell comprises metal, polymer, ceramic, composite, or combinations thereof, and
the 3D printed proppant has a particle size from 8 mesh to 140 mesh.

2. The 3D printed proppant of claim 1, wherein the core, the support bars, the shell, or combinations thereof comprises metal comprising titanium alloy, nickel alloy, aluminum alloy, titanium-aluminum alloy, chromium alloy, cobalt alloy, copper alloy, gallium alloy, iron alloy, or combinations thereof.

3. The 3D printed proppant of claim 1, wherein the core, the support bars, the shell, or combinations thereof comprises ceramic comprising crystalline inorganic metal oxides, bauxite, kaolin, magnesium oxide, alumina, nitride, carbide, carbon, silicon, ground ceramic, ceramic matrix composites, composites, or combinations thereof.

4. The 3D printed proppant of claim 3, wherein the core, the support bars, the shell, or combinations thereof comprises ground ceramic comprising calcined clay, un-calcined clay, bauxite, silica, alumina, geopolymer, or combinations thereof and having an average particle size from 1 to 12 micron.

5. The 3D printed proppant of claim 4, wherein:
the ground ceramic comprises reinforcing agents;
the reinforcing agents comprise alumina, carbon, silicon carbide, alumina, mullite, or combinations thereof; and
the reinforcing agents comprise particles having a particle size from 1 to 50 microns, fibers having an aspect ratio of greater than 1:2, or both.

6. The 3D printed proppant of claim 4, wherein:
the ground ceramic comprises from 0.1 to 1.5 wt. % binder material by weight of ground ceramic; and
the binder material comprises metal, ceramic, heavy fuel oil, boron nitride, oxynitride glass, aluminum carbide, silicon carbide, aluminum nitride, bismuth tertroxide, boron oxide, zirconia, silica, rare earth oxides, poly(2-ethyl-2-oxazoline) solution, polyvinyl alcohol solution, waxes, starch, or combinations thereof.

7. The 3D printed proppant of claim 1, wherein the core, the support bars, the shell, or combinations thereof comprises polymer comprising thermoset resins, polyester, urea aldehyde, polyurethane, vinyl esters, furfural alcohol, or combinations thereof.

8. The 3D printed proppant of claim 7, wherein the core, the support bars, the shell, or combinations thereof comprises resin comprising phenolic resin, epoxy resin, furan resin, polyurethane resin, polyurea resin, polyamide-imide resin, polyamide resin polyurea/polyurethane resin, urea-formaldehyde resin, melamin resin, silicone resin, vinyl ester resin, or combinations thereof.

9. A method of producing a 3D printed proppant comprises:
providing a 3D printing apparatus that produces the 3D printed proppant;
distributing a layer of build material within a build chamber of the 3D printing apparatus, wherein the build material comprises metal, polymer, ceramic, composite, or combinations thereof;
depositing a layer of binder material on the layer of build material;
curing the binder material within the 3D printing apparatus; and
repeating as necessary to produce the 3D printed proppant, wherein:
the 3D printed proppant comprises a core, support bars extending from the core to a shell, and the shell encapsulating the core and the support bars,
the support bars have a length of from 85 micrometers to 200 micrometers,
the core comprises metal, polymer, ceramic, composite, or combinations thereof,
the support bars comprise metal, polymer, ceramic, composite, or combinations thereof,
the shell comprises metal, polymer, ceramic, composite, or combinations thereof, and
the 3D printed proppant has a particle size from 8 mesh to 140 mesh.

10. The method of claim 9, wherein, the support bars, the core, the shell, or combinations thereof comprises metal comprising titanium alloy, nickel alloy, aluminum alloy, titanium-aluminum alloy, chromium alloy, cobalt alloy, copper alloy, gallium alloy, iron alloy, or combinations thereof.

11. The method of claim 9, wherein the core, the support bars, the shell, or combinations thereof comprises ceramic comprising crystalline oxide, bauxite, kaolin, magnesium oxide, alumina, nitride, carbide, carbon, silicon, ground ceramic, composite, or combinations thereof.

12. The method of claim 9, wherein the core, the support bars, the shell, or combinations thereof comprises polymer comprising resin, polyester, urea aldehyde, polyurethane, vinyl esters, furfural alcohol, or combinations thereof.

13. The 3D printed proppant of claim 1, wherein the 3D printed proppant has a density of less than 2.5 grams per cubic centimeter (g/cc) and a tensile strength of from 40 to 1500 Mega Pascals (MPa).

14. The method of claim 9, wherein the 3D printed proppant has a density of less than 2.5 grams per cubic centimeter (g/cc) and a tensile strength of from 40 to 1500 Mega Pascals (MPa).

15. The 3D printed proppant of claim 1, wherein the 3D printed proppant consists of:
the core;
the support bars; and
the shell.

16. The method of claim 11, wherein the core, the support bars, the shell, or combinations thereof comprises ground ceramic comprising calcined clay, un-calcined clay, bauxite, silica, alumina, geopolymer, or combinations thereof and having an average particle size from 1 to 12 micron.

17. The method of claim 16, wherein:
the ground ceramic comprises reinforcing agents;
the reinforcing agents comprise alumina, carbon, silicon carbide, alumina, mullite, or combinations thereof; and
the reinforcing agents comprise particles having a particle size from 1 to 50 microns, fibers having an aspect ratio of greater than 1:2, or both.

18. The method of claim 16, wherein:
the ground ceramic comprises from 0.1 to 1.5 wt. % binder material by weight of ground ceramic; and
the binder material comprises metal, ceramic, heavy fuel oil, boron nitride, oxynitride glass, aluminum carbide, silicon carbide, aluminum nitride, bismuth tertroxide, boron oxide, zirconia, silica, rare earth oxides, poly(2-ethyl-2-oxazoline) solution, polyvinyl alcohol solution, waxes, starch, or combinations thereof.

19. The method of claim 12, wherein the core, the support bars, the shell, or combinations thereof comprises resin comprising phenolic resin, epoxy resin, furan resin, polyurethane resin, polyurea resin, polyamide-imide resin, polyamide resin polyurea/polyurethane resin, urea-formaldehyde resin, melamin resin, silicone resin, vinyl ester resin, or combinations thereof.

20. The method of claim 9, wherein the 3D printed proppant consists of:
the core;
the support bars; and
the shell.

* * * * *